(12) United States Patent
Johnson et al.

(10) Patent No.: US 6,962,629 B2
(45) Date of Patent: Nov. 8, 2005

(54) METHOD FOR MOVING CONTAMINANTS FROM GASES

(75) Inventors: Michael Clinton Johnson, Grand Island, NY (US); Carl Joseph Heim, Amherst, NY (US); John Fredric Billingham, Getzville, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 10/370,045

(22) Filed: Feb. 19, 2003

(65) Prior Publication Data

US 2003/0221704 A1 Dec. 4, 2003

Related U.S. Application Data

(60) Provisional application No. 60/358,065, filed on Feb. 19, 2002.

(51) Int. Cl.[7] .................................................. B08B 7/04
(52) U.S. Cl. .............................. 134/13; 134/10; 134/34; 95/141; 95/143; 210/721; 210/763
(58) Field of Search .............................. 134/10, 13, 34, 134/31; 95/141, 143, 118, 135, 138; 210/721, 763; 92/541; 55/487, 527, 528, 498

(56) References Cited

U.S. PATENT DOCUMENTS

| | | | |
|---|---|---|---|
| 4,521,387 A | 6/1985 | Broecker et al. | |
| 4,699,642 A | 10/1987 | Perry et al. | |
| 4,759,782 A | 7/1988 | Miller et al. | |
| 4,972,677 A | 11/1990 | Moriya et al. | |
| 5,470,154 A | 11/1995 | Nishizawa et al. | |
| 5,557,030 A | 9/1996 | Markovs et al. | |
| 5,612,011 A | 3/1997 | Ghisolfi et al. | |
| 5,738,835 A | 4/1998 | Brueck et al. | |
| 5,858,068 A | 1/1999 | Lansbarkis et al. | |
| 5,914,091 A | 6/1999 | Holst et al. | |
| 5,976,221 A | 11/1999 | Bowman et al. | |
| 6,074,459 A | 6/2000 | Gingrich et al. | |
| 6,099,619 A | 8/2000 | Lansbarkis et al. | |
| 6,224,843 B1 | 5/2001 | Ahmed et al. | |
| 6,327,872 B1 | 12/2001 | Boyd et al. | |
| 6,361,696 B1 | 3/2002 | Spiegelman et al. | |
| 2001/0050096 A1 | 12/2001 | Costantini et al. | |

FOREIGN PATENT DOCUMENTS

WO   WO 02/085528 A2   10/2002

OTHER PUBLICATIONS

Arthur L. Kohl & Richard B. Nielsen, Gas Purification 1145–63 (5th ed. 1997).

Richard R. Zito, $CO_2$ Snow Cleaning of Optics: Curing the Contamination Problem, Proc. of SPIE—The Int'l Soc'y for Optical Eng'g 4096 (2000).

Primary Examiner—M. Kornakov
(74) Attorney, Agent, or Firm—Iurie A. Schwartz (57) ABSTRACT

Carbon dioxide is purified through the use of catalytic oxidation. Carbon dioxide is exposed to at least one catalyst, oxidizing at least a portion of the nonvolatile organic residues to form purified carbon dioxide that is directed to an application. Carbon dioxide that is in a near-critical, critical, or supercritical phase can be exposed to the catalyst.

27 Claims, 9 Drawing Sheets

METHOD FOR MOVING CONTAMINANTS FROM GASES

RELATED APPLICATION(S)

This application claims the benefit of U.S. Provisional Application No. 60/358,065, filed on Feb. 19, 2002. The entire teachings of the above application is incorporated herein by reference.

BACKGROUND OF THE INVENTION

Carbon dioxide supplied to food and beverage customers normally meets a purity specification known as Enhanced Ingredient Grade (EIG). Carbon dioxide of this purity is sufficient for use in food and beverages, and most plants can produce it.

Some applications require carbon dioxide of higher purity than EIG. For example, supercritical fluid extraction and supercritical fluid chromatography require small amounts of higher purity carbon dioxide. Examples of the types of higher purity carbon dioxide include Supercritical Fluid Extraction (SFE) and Supercritical Fluid Chromatography (SFC) grades. These grades of carbon dioxide are generally supplied in cylinders.

Additional applications requiring high purity and ultra-high purity (UHP) carbon dioxide have recently been developed. These include pharmaceutical processing, semiconductor processing (e.g., photoresist removal and wafer cleaning), micro-electromechanical systems (MEMS) drying, and metal target cleaning.

Previous methods for purifying carbon dioxide include distillation. Single-stage distillation is a commonly employed technique, in which carbon dioxide vapor is taken from a bulk tank or a cylinder and passed through a condensing unit, where it partially condenses. Heavy contaminants concentrate in the resulting liquid phase. The resulting purified vapor phase is sent to the application. By drawing from the vapor space, the concentration of contaminants is reduced by about one order of magnitude over that in delivered liquid. The efficacy of this approach depends on the condensation pressure. As this pressure increases, the concentration of heavy components in the vapor phase increases. Thus, a better separation is achieved at lower pressures. Unfortunately, carbon dioxide does not exist as a liquid at low pressures, rendering single-stage distillation ineffective for those pressures. At those pressures for which single-stage distillation is effective, the degree of contaminant removal is unacceptable for applications requiring high purity and UHP carbon dioxide. In addition, as the vapor is removed from the cylinder the pressure drops. If the pressure drops quickly, liquid boiling will cause significant turbulence. This turbulence can project fine droplets into the vapor space. These droplets, which contain elevated levels of contamination, are withdrawn along with the vapor.

Another approach to removing contaminants from carbon dioxide is adsorption. Carbon dioxide is passed through a bed containing adsorptive material, such as activated carbon. The contaminants are adsorbed onto the material, and carbon dioxide flows out of the bed with fewer contaminants.

U.S. Pat. No. 5,470,154 discloses the use of two adsorbent beds to remove contaminants and produce 99.999% carbon dioxide. One bed contains molecular sieves or alumina and the other contains activated carbon. This purification is to be done at close to atmospheric pressure, and is likely to be ineffective for removing certain types of contaminants.

R. Zito, "$CO_2$ Snow Cleaning of Optics", Proceedings of SPIE, Vol. 4096 (2000) discloses a means of using an adsorption bed to solve the problem of providing UHP carbon dioxide for precision cleaning of optics using carbon dioxide snow.

U.S. Pat. No. 6,099,619 discloses a point-of-use purifier to produce high-purity carbon dioxide vapor by passing carbon dioxide through an adsorbent bed or beds for purification. The adsorbent bed is sized depending on the amount and quality of carbon dioxide needed.

Adsorbent beds have several disadvantages when used to clean carbon dioxide. First, adsorbent beds are not effective for removing certain types of contaminants from carbon dioxide because most adsorbents have a strong affinity for both the carbon dioxide and the contaminants. This leads to competition for adsorption sites, and decreased adsorbent ability. Secondly, adsorbent beds are not effective for removing certain sizes of contaminants from carbon dioxide. Contamination can include a broad range of molecules in terms of both size and composition, and it is difficult to design an adsorbent train that will capture all such molecules so that the carbon dioxide reaches the required purity.

In liquid absorptive purification, contaminant-containing carbon dioxide vapor is contacted with clean carbon dioxide liquid. The contaminant in the carbon dioxide vapor generally migrates to the liquid carbon dioxide to some extent, purifying the carbon dioxide vapor. The efficiency of purification depends on the ability of the system to effectively contact the solid particles and aerosol droplets in the gas with the liquid carbon dioxide. Also, the relative affinity of the contaminants for the vapor and liquid carbon dioxide will affect the ability of this purification method. Hence, this approach is generally ineffective for removing those contaminants that have little or no relative affinity for carbon dioxide in the liquid phase.

A particulate filter may be used to remove contaminants from carbon dioxide. U.S. Pat. No. 4,972,677 discloses vaporization of liquid carbon dioxide prior to passing it through a particulate filter for purification. The resulting purified vapor is then re-condensed. Downstream of the filter, the carbon dioxide flows through equipment having ultra smooth inner surfaces cleaned by electro or chemical polishing. Generally, particulate filters can remove solid contaminants but are inefficient for the removal of contaminants in a liquid or vapor phase. Even if a liquid aerosol droplet is larger than the pore size of the filter, the droplet can push through the pores of the filter and re-entrain in the gas downstream of the filter.

U.S. Pat. No. 4,759,782 discloses the use of a coalescing filter to remove liquid contaminant particles, such as water and oil, from compressed gas streams. A coalescing filter is different than a particulate filter. Liquid droplets collect on the coalescent filter element and merge together to form larger droplets. Eventually, the merged droplets grow large enough to fall to the bottom of the coalescing filter housing where they can then be removed. Coalescing filters are effective for removal of solids and liquid particles, but vapor molecules pass through them. The stream leaving the coalescer has reduced solid or liquid particles but tends to be saturated with vapor phase contaminant. In addition, when the amount of solids is high, coalescing filters must be protected with a particulate filter to prevent them from becoming clogged.

U.S. Pat. No. 6,327,872 discloses a delivery system aimed at serving applications that require high purity carbon dioxide. A filter (coalescing and/or adsorbent filters) is used to increase the purity of carbon dioxide vapor. The vapor is then condensed in a condenser and directed to two tanks at a relatively low pressure. Heating the tanks increases the pressure. By using two tanks, a constant flow of liquid can be delivered without the use of compressors or pumps. This method is generally unable to remove contaminants that are in a vapor phase and/or are not removed by the adsorbent filter.

U.S. Pat. No. 5,976,221 discloses the use of coalescing filters followed by an adsorbent bed containing a macroporous polymeric material to remove oil from compressed air. The coalescers are used to reduce the liquid oil content in air coming from the compressor from 5 to 10 ppm by weight to less than 1 ppm. The macroporous adsorbent is used to reduce the amount of liquid oil and oil vapor from less than 1 ppm to less than 10 ppb.

Thermal catalytic oxidation is a process by which hydrocarbons are removed from a gas by reaction with an oxidant, such as oxygen, to form carbon dioxide and water. Kohl and Nielsen, "Gas Purification", $5^{th}$ Ed., Gulf Publishing Company, Houston (1997) disclose a generic thermal catalytic oxidation system for use in removing volatile organic compounds (VOCs) from an air stream. The thermal catalytic oxidation system has three unit operations: a heat exchanger, a burner, and a catalyst bed. The air that is to be purified first passes through one side of the heat exchanger where it is heated by indirect contact with hot gas leaving the catalyst bed. The preheated air then flows to the catalyst bed where its temperature is raised further by mixing it with hot combustion gases from the burner. The hot air flows across the catalyst where the VOCs react with oxygen to form carbon dioxide and water. Heat is released by this reaction, and the temperature of the air stream increases. The hot purified air exits the catalyst bed and flows into the heat exchanger where it is cooled by indirect contact with the incoming air. The catalyst includes a platinum group metal deposited on an alumina support. The support is either in the form of pellets that are arranged in a packed reactor bed or in the form of a monolithic structure whose passages are coated with the catalyst material. Older designs used the pellet catalysts exclusively, but more modern systems often employ monoliths. Because the destruction of low molecular weight hydrocarbon (e.g., methane, ethane) requires a large amount of energy, the system taught in Kohl and Nielsen must be operated at very high temperatures.

U.S. Pat. No. 5,612,011 describes a process for purifying an inert gas leaving a solid-state polycondensation reactor. The inert gas is mixed with an oxygen-containing gas and sent to a thermal catalytic oxidation system. The thermal catalytic oxidation system comprises a platinum or platinum-based catalytic bed operating at temperatures between 250 and 600° C. Purified gas leaving the bed is directed to a solid-state polycondensation reactor to eliminate the water formed during the oxidation process.

U.S. Pat. No. 5,738,835 describes a process for purifying a gas from the thermal solid-phase treatment of condensation polymers. This gas is mixed with an oxygen-containing gas and added to a thermal catalytic oxidation system. Oxygen-containing gas is added such that the carbon monoxide level in the stream leaving the thermal catalytic oxidation system is maintained between 30 and 100 volumes per million.

Both the '011 and '835 patents control the temperature of the thermal catalytic oxidation unit based on the carbon monoxide content in the effluent. However, this approach is not appropriate for controlling the level of some types of contaminants.

U.S. Pat. No. 5,914,091 describes a point-of-use thermal catalytic oxidation system for treatment of gaseous waste streams leaving a semiconductor manufacturing process units. The waste stream is pressurized using a fan or blower, then warmed to the thermal catalytic oxidation unit operating temperature by a heat exchanger and supplemental heater. It then enters the thermal catalytic oxidation unit. The resulting purified stream is cooled to near ambient temperature in the heat exchanger before it is vented. The heat exchanger and supplemental heater are arranged to effect autothermal catalytic oxidation of VOCs contained in the gaseous waste stream. By definition, VOCs include substances such as methane and ethane. As a result, the thermal catalytic oxidation unit must be operated at very high temperatures in order to ensure oxidation of VOCs.

WO 02/085528 A2 describes a process for treatment of carbon dioxide that is used in dense phase applications. Untreated carbon dioxide is sent to a coalescing filter to remove gross hydrocarbon impurities. It is then sent to a membrane filter to remove water. Finally, it is sent to a photo- or thermal-catalytic treatment unit to remove light hydrocarbons at sub-critical pressures. The resulting purified carbon dioxide is sent to a filter to remove any remaining impurities. WO 02/085528 A2 states that the purpose of its thermal catalytic oxidation unit is to remove all hydrocarbons and specifically states that it removes volatile hydrocarbons. Therefore, it must operate at very high temperatures. Also, a hydrocarbon analyzer is used to measure complete volatile hydrocarbon removal, which is not appropriate for the removal of some types of contaminants.

Therefore a need exists for methods and systems that reduce or minimize the above-referenced problems.

SUMMARY OF THE INVENTION

Emerging applications often require ultra-pure carbon dioxide with lower contaminant levels than demanded by previous processes. This invention recognizes that at high pressure, UHP carbon dioxide often includes dissolved contaminants. A change in condition can cause the dissolved contaminants to precipitate, forming an aerosol of gaseous carbon dioxide and suspended contaminant particles. The suspended contaminant particles can interfere with carbon dioxide applications. This invention generally relates to purifying carbon dioxide through the use of catalytic oxidation. This invention provides a method for effectively removing the soluble and non-soluble portions of NVOR such that suspended particles do not interfere with carbon dioxide applications.

In one embodiment, the invention is directed to a method for delivering purified carbon dioxide to an application, comprising the steps of a) determining an acceptable level of nonvolatile organic residues in purified carbon dioxide, such that the use of the purified carbon dioxide in an application will result in an acceptable product; b) exposing carbon dioxide to at least one catalyst at a temperature controlled to produce the purified carbon dioxide; and c) directing the purified carbon dioxide to the application.

In another embodiment, the invention is directed to a method for purifying carbon dioxide, comprising the steps of a) exposing carbon dioxide to at least one catalyst, wherein the carbon dioxide is in a condition selected from the group consisting of near-critical, critical, and supercritical; and b) oxidizing at least a portion of the contaminants, thereby forming purified carbon dioxide.

A further embodiment of the invention includes a method for delivering purified carbon dioxide to an application, comprising the steps of a) determining a minimum oxidation temperature, wherein exposing carbon dioxide to a catalyst at that minimum oxidation temperature will result in a purified carbon dioxide that will produce a product with an acceptable quality when the purified carbon dioxide is used in the application; b) exposing carbon dioxide to at least one catalyst at a temperature not substantially greater than the minimum oxidation temperature, thereby producing purified carbon dioxide; and c) directing at least a portion of the purified carbon dioxide to the application.

The invention has several advantages. It provides a thermal catalytic oxidation ("catox") means that can effectively reduce both vapor and liquid phase contaminant levels by orders of magnitude. Practicing the invention results in the removal of contaminants that precipitate from solution and form an aerosol of carbon dioxide gas and contaminant particles. A user of this invention can oxidize a sufficient portion of the contaminants so that the carbon dioxide can be used in an application without deposition of an unacceptable amount of contaminant particles in or onto the product.

This invention recognizes that for some applications, volatile hydrocarbons, such as methane and ethane, do not precipitate and do not need to be removed in order to obtain satisfactory results during a carbon dioxide application. Furthermore, this invention recognizes that those higher-weight contaminants that will precipitate do not have to be oxidized completely, but only to a form that does not precipitate from solution during a carbon dioxide application. This invention allows identification of a thermal catalytic oxidation unit temperature at which contaminants that will precipitate are oxidized, but light hydrocarbons are not. This allows the invention to be practiced with lower operating temperatures and reduced energy consumption.

The method of the invention can be conducted with near-critical, critical or supercritical carbon dioxide, thereby, eliminating the need for further compression downstream of the catalytic unit, and associated equipment such as pumps and/or compression units that can introduce contaminants into the carbon dioxide can be omitted. Oxidizing contaminants while the carbon dioxide is in a near-critical, critical, or supercritical state has advantages for breaking down the contaminants in the reactor since it will normally increase the fraction of the contaminant in the vapor phase.

This invention allows purification of carbon dioxide for applications requiring small flow rates. It also allows a system that can be attached to existing carbon dioxide flow streams, such as those delivered from a series of cylinders. This invention can be used to purify any carbon dioxide stream, including those streams that use commercially produced liquid carbon dioxide.

DETAILED DESCRIPTION OF THE INVENTION

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

The present invention generally relates to applications that use carbon dioxide. Preferably, the application uses carbon dioxide at a pressure lower than about 10,000 psia. More preferably, the application uses carbon dioxide at a pressure less than about 4,000 psia. The invention is particularly well suited for applications that use carbon dioxide in a supercritical, critical, or subcritical phase. Carbon dioxide has a critical temperature of 31° C. and a critical pressure of 1070 psia (~7377.4 kPa), a triple point pressure and temperature of 75 psia (~517.1 kPa) and −57° C., respectively, and has a sublimation temperature at ambient pressure of approximately −78° C.

This invention is particularly suited for applications that require high purity carbon dioxide, preferably, applications that require ultra-high purity carbon dioxide (UHP). As used herein, the term "ultra-high purity" refers to a carbon dioxide that contains contaminants in concentrations of around 10 ppb by weight ($1 \times 10^{-6}$ wt. %) or less. Examples of applications that employ ultra-high purity carbon dioxide applications include MEMS cleaning and drying, the manufacture of high-quality optical devices, drug production and other pharmaceutical applications, wafer cleaning, and others.

Contaminants in a carbon dioxide stream can include solid particles, such as small (e.g., microscopic) pieces of metal shed by machinery used in the carbon dioxide application. Generally, solid contaminants do not dissolve in high pressure or supercritical carbon dioxide.

The contaminants also can include non-volatile residue (NVR). As used herein, the term "non-volatile residue" refers to that portion of contaminants that remains following sublimation or evaporation of the carbon dioxide at room temperature and pressure. A portion of this NVR will typically consist of solid particles, such as may have shed from metal surfaces during processing as described above. A further portion of the NVR typically consists of non-volatile organic residue (NVOR). As used herein, the term "non-volatile organic residue" refers to that portion of the NVR that is soluble in carbon dioxide at some pressure and temperature. While the exact chemical composition of NVOR is often unknown, examples include heavy organics ($C_{10+}$) such as aliphatic hydrocarbon-based heavy oils, halocarbons, and particulate matter that is soluble in carbon dioxide under certain conditions but can form a second phase at other pressure and temperature conditions, e.g., at atmospheric pressure and room temperature. Sources of NVOR include compressor oils and elastomeric materials that have some solubility in liquid carbon dioxide and are commonly found in gasket and valve seat material. In clean distribution systems, the majority of the NVR present is commonly in the form of NVOR.

The solubility of NVOR contaminants in carbon dioxide is a strong function of density, which is in turn a function of temperature and pressure. At high pressures, the solvation functionality is not simple, but in general, high pressures and temperatures favor the solubility of NVORs in carbon dioxide. With decreases in temperature and pressure, the solubility of NVORs in carbon dioxide typically decreases. At ambient temperatures and pressures, for example, NVORs generally precipitate from the carbon dioxide, forming an aerosol of gaseous carbon dioxide and suspended particulate contaminants. The suspended NVOR particles are believed to be mostly in the form of liquid droplets.

Examples of applications that use carbon dioxide include electronics applications, such as photoresist stripping and deposition; pharmaceutical applications, such as nanoparticle formation; and the processing of micro-electro-mechanical systems (MEMS). Further examples of electronics applications include supercritical carbon dioxide-based wafer cleaning applications. In those processes, carbon dioxide is brought to a temperature and pressure that exceed the critical point (31° C. at ~7377.4 atm) either prior to or after being injected into a wafer-cleaning tool. While this fluid is at conditions that exceed the critical point, NVOR tends to remain in solution and not deposit on the wafer. However, as the tool is depressurized, this NVOR becomes insoluble in carbon dioxide and deposits on the wafer as particles, producing a contaminated wafer.

Some applications use carbon dioxide snow to clean wafers. In those applications, liquid carbon dioxide is typically expanded to ambient pressure, producing a mixture of carbon dioxide snow and vapor. As the pressure associated with the liquid carbon dioxide is reduced, its temperature is also reduced. This reduced pressure and temperature can cause NVOR to precipitate, forming an aerosol. A significant portion of this aerosol is in the size range of about 0.1 to about 0.6 microns.

In processes utilizing liquid or supercritical carbon dioxide, the processing conditions of the carbon dioxide will typically change. These changes in conditions can cause NVOR to exceed its solubility limit and precipitate from the carbon dioxide.

These precipitated NVOR particles or droplets can impinge or be taken up into the product and deposit onto the surface, interfering with successful completion of the process and product quality, e.g., a workpiece or a pharmaceutical powder.

Deposition of particles are a particular concern for processes that have very high cleanliness requirements. For example, at some point in a cleaning process, the cleaning chamber is normally opened in order to remove the product being cleaned. Often, this necessitates that the chamber environment be depressurized to atmospheric pressure. Any carbon dioxide still within the cleaning chamber will drop in pressure, causing dissolved contaminants to precipitate from the carbon dioxide and impinge or deposit on the previously clean product. If the process is a semiconductor cleaning application and the product is a wafer, the wafer can be fouled by impinged precipitated particles on its fine-featured surface. The result is a contaminated wafer with low associated yield (usable portion of the wafer).

In the manufacture of fine powders for the pharmaceutical industry, such as may be used for drugs delivered through inhalation, powders are often formed following evaporation of carbon dioxide. Again, NVOR can contaminate the resulting product. Since the weight of powder is small relative to the weight of the carbon dioxide in the original solution, the level of contamination in the final product may be significant.

Aerosol droplets and dissolved contaminants can not be filtered effectively from the carbon dioxide, if at all. Solid particles that do not dissolve in the carbon dioxide are less of a concern because they can be filtered from the carbon dioxide before it reaches the application.

This invention recognizes and addresses the NVOR removal from carbon dioxide for these applications. One embodiment of this invention is a method for delivering purified carbon dioxide to an application. The method is described with respect to FIG. 1, which illustrates a schematic diagram of system 2. System 2 includes tank 4 containing carbon dioxide to be purified. Preferably, tank 4 contains carbon dioxide liquid at about 100–500 psig (about 689.5–3,447.4 kPa) and more preferably liquid at about 200–350 psig (about 1,379–2413.2 kPa). Generally, liquid carbon dioxide contains about 10 ppm by weight NVOR or less, preferably about 5 ppm by weight NVOR or less.

Figure 1:
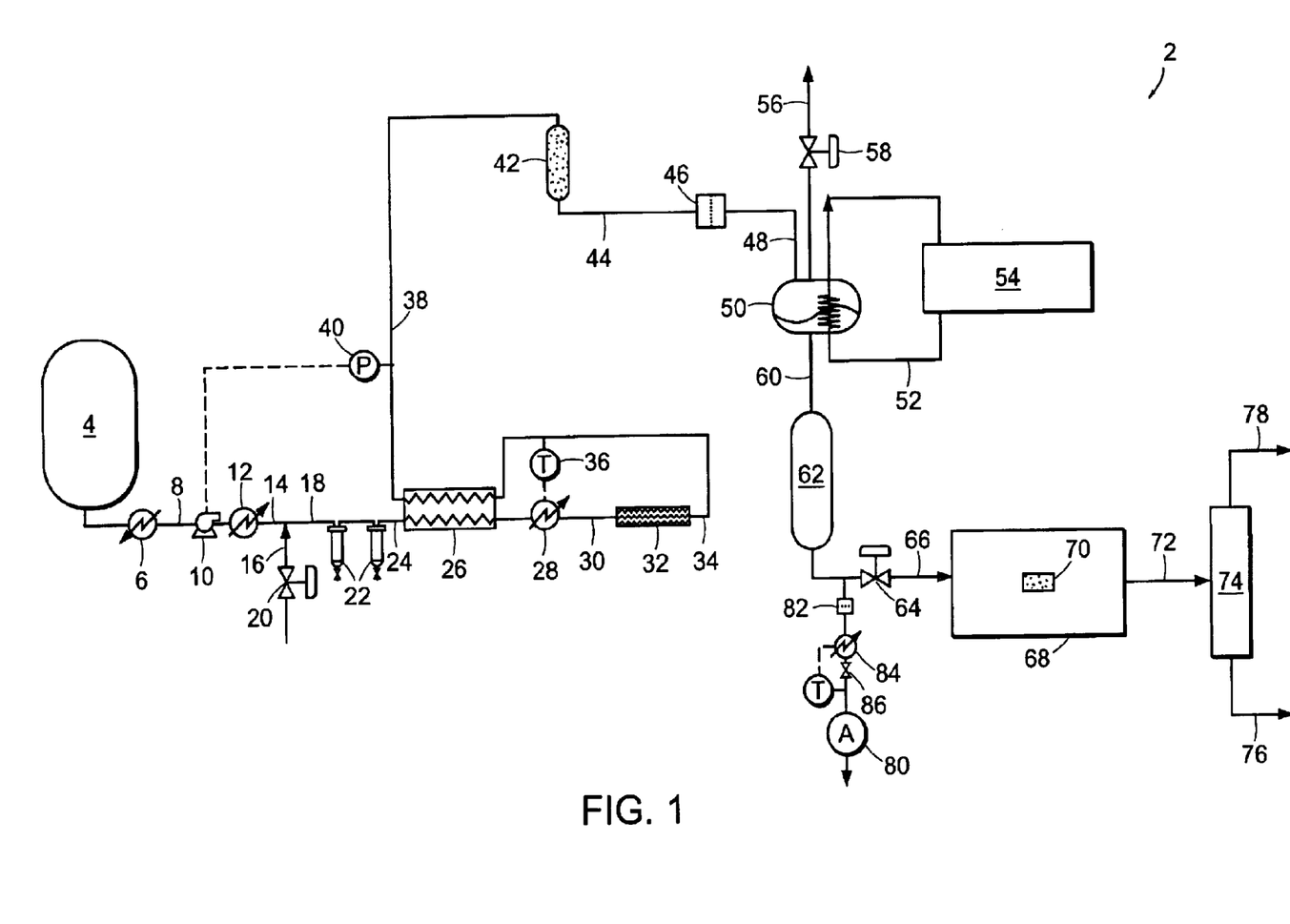
FIG. 1 illustrates a schematic of a system for conducting one embodiment of the method of the invention.

Carbon dioxide is drawn from tank 4, subcooled in heat exchanger 6, and then directed to pump 10 as stream 8. The extent to which the carbon dioxide in stream 8 is subcooled by heat exchanger 6 depends on the requirements of pump 10 in order to prevent cavitation. To prevent further NVOR contamination of the carbon dioxide, pump 10 is preferably the diaphragm variety that has no wetted parts made of elastomers. The pressure of carbon dioxide leaving pump 10 can be, for example, in the range of about 800 to about 5,000 psia (~5,516–34,473 kPa). Preferably, the range will be about 900 to about 3,000 psia (~6,205–20,684 kPa), e.g. 1,000 psig (~6895 kPa).

The pressurized carbon dioxide from pump 10 is then vaporized or heated in heater 12. Heater 12 may employ electrical resistive heating. If the pressure of the carbon dioxide exceeds its critical pressure (~7253 kPa), then heater 12 will simply heat and not vaporize the pressurized carbon dioxide from pump 10. At supercritical pressures, heater 12 can be omitted.

The carbon dioxide leaves heater 12 as stream 14 (in a vapor or supercritical phase) and is then mixed with oxidant stream 16 to form stream 18. Oxidant stream 16 is preferably oxygen or an oxygen containing gas, such as air or oxygen-enriched air. Most preferably, oxidant stream 16 is oxygen. Other oxidants, such as hydrogen peroxide; ozone; nitrous oxide; chlorine dioxide; and/or permanganate such as potassium permanganate also can be employed. Oxidant stream 16 may contain other reactants, such as moisture, or water, which are later used to promote the break up of large molecular weight contaminants in carbon dioxide stream 14. The flow rate of oxidant stream 16 is controlled using valve 20 or a mass flow controller. The flow rate of oxidant stream 16 can be chosen so that there is sufficient oxidant in resulting stream 18 to facilitate the desired amount of oxidation. If carbon dioxide stream 14 already contains sufficient oxygen to oxidize the NVOR, oxidant stream 16 can be omitted.

Stream 18 is then directed to coalescer 22. Coalescer 22 is used to reduce aerosol contamination, including fine solid particles that may result from shedding from metal surfaces, and heavy contaminants that were dissolved in the carbon dioxide but came out of solution when the carbon dioxide was passed through heat exchanger 6 and/or heater 12.

Coalescer 22 may include one or more high-efficiency coalescing filters, such as a cartridge type that contains a fine fiber mat which presents a large amount of surface area for the coalescence of drops and can reduce the portion of the contaminant that is in a solid or precipitated phase to about 0.05 ppm by weight or less. Preferably, the material of construction will be such that exposure of the carbon dioxide to elastomeric materials is minimized or reduced. If the carbon dioxide is in a critical or supercritical phase, coalescer 22 may be omitted.

The carbon dioxide is then directed from coalescer 22 as stream 24. Stream 24 directs the carbon dioxide to recuperative heat exchanger 26. Recuperative heat exchanger 26 warms the carbon dioxide in stream 24 before it enters heater 28. Recuperative heat exchanger 26, in conjunction with heater 28, ensures that the operating temperature of the catalytic reactor 32 is sufficient to ensure that a desired amount of contaminants are oxidized.

Carbon dioxide leaves heater 28 as stream 30 and is directed to catalytic reactor 32. The carbon dioxide entering catalytic reactor 32 can be a gas, a liquid, a critical fluid, a supercritical fluid, or a near-critical fluid. As used herein, "near-critical" fluid refers to a fluid that is at a temperature below its critical temperature ($T_c$) but above a reduced temperature ($T_r$), which is the ratio of a material's actual temperature over its critical temperature, of about 0.75. Due to the proximity to its critical point, a near-critical fluid is in a liquid-like state that exhibits a great deal of compressibility in contrast to most liquids that are far below their critical point. Generally, the solvent properties of near-critical liquids are strongly dependent upon pressure, although usually to a lesser extent than most supercritical fluids.

Catalytic reactor 32 contains at least one catalyst that enhances the oxidation of contaminant molecules to oxidation products with smaller molecular weights. It is believed that NVRs with smaller molecular weights are less likely to precipitate from the carbon dioxide than those with higher molecular weights. As used herein, "oxidation" includes complete oxidation, partial oxidation, or otherwise breaking the intramolecular bonds of a molecule to produce products with smaller molecular weights. For example, the complete oxidation of a hydrocarbon can result in oxidation products such as carbon dioxide and/or water, while the partial oxidation of a hydrocarbon can result in oxidation products that include one or more smaller hydrocarbons, carbon dioxide, and/or water. The complete oxidation of a halocarbon can result in oxidation products that include carbon dioxide and/or a halogen acid gas, while the partial oxidation of the same halocarbon may result in one or more smaller hydrocarbons or halocarbons, carbon dioxide, a halogen acid gas, and/or water.

The catalysts can be in the form of pellets, a monolith, or other shapes. The catalyst can include precious and nonprecious metals that will catalyze the oxidation of chemical bonds found in organic compounds, such as carbon-carbon, nitrogen-carbon, carbon-halogen, and carbon-oxygen bonds. Examples of suitable catalysts include platinum, platinum on alumina, palladium, palladium on alumina, iridium, iron, rhodium, ruthenium, nickel, and others. Preferably, the catalyst contains platinum or palladium.

The operating temperature of catalytic reactor 32 generally depends on the purity requirements for the carbon dioxide, the purity of the incoming stream, the type of catalyst employed, and other consideration. Generally, the operating temperature is sufficient to oxidize enough NVOR so that when the resulting purified carbon dioxide is used in application 68, the amount of particle deposition on or incorporation in product 70 is acceptable. This does not necessarily require complete hydrocarbon destruction, so the temperature can be lower than that required to completely oxidize VOCs. For some applications, the amount of particle deposition or incorporation can be made acceptable if only a portion of the dissolved contaminants is oxidized. For example, some applications may only require that contaminants with a relatively high molecular weight be oxidized to a lower molecular weight because the smaller molecule contaminants will then remain in solution longer and will not be deposited or incorporated into the product. Preferably, the operating temperature is less than that required by the catalyst to oxidize methane. Generally, catalytic reactor 32 is operated at a temperature in the range of about 200 to about 550° F. (~93–288° C.), more preferably in the range of about 350 to about 550° F. (~177–288° C.).

In one embodiment, carbon dioxide is exposed to the catalyst at a temperature that is not substantially greater than a temperature sufficient to oxidize NVORs in carbon dioxide to produce a purified carbon dioxide that has a level of NVORs that is not greater than an acceptable level for a given application. As used herein, a temperature that is "substantially greater" than a temperature sufficient to oxidize NVORs is a temperature at which essentially all methane in the carbon dioxide is also oxidized using the same catalyst. An "acceptable" level of NVOR in carbon dioxide is a level that will allow the carbon dioxide to be used in an application so that a product with an acceptable quality is produced.

The space velocity of the carbon dioxide in catalyst reactor 32 generally depends on the catalyst material used, the form of the catalyst, the operating temperature, and other considerations. For platinum on alumina monolithic catalysts operating at 350° F. (~177° C.), the space velocity is preferably less than about 500,000 scfh/ft$^3$ (500,000 standard cubic meters per hour per cubic meter of catalyst) and more preferably less than about 200,000 scfh/ft$^3$ (200,000 standard cubic meters per hour per cubic meter of catalyst).

The purified carbon dioxide exits catalytic reactor 32 as stream 34. Analyzer 36 measures the temperature of stream 34 with a temperature measurement device, such as a thermocouple. If analyzer 36 measures a temperature that varies from a predetermined value, it can turn heater 28 on or off. In this way, analyzer 36 ensures that stream 30 is at a proper temperature so that the temperature inside of catalytic reactor 32 is sufficient to promote the desired amount of oxidation.

Stream 34 is then directed through recuperative heat exchanger 26, where it is cooled. In recuperative heat exchanger 26, stream 24 and stream 34 can flow in a counter-current, co-current, pipe-in-pipe, or cross-flow configurations, preferably in a counter-current configuration. The purified carbon dioxide leaves recuperative heat exchanger 26 as stream 38.

In a preferred embodiment, pump 10 is activated by pressure analyzer 40, which measures the pressure of stream 38 exiting recuperative heat exchanger 26. Pressure analyzer 40 activates pump 10 when it measures a pressure below a predetermined value.

Without any further purification, the amount of NVOR in carbon dioxide stream 38 can be about 1,000 precipitated particles per standard cubic foot (~35,000 particles per standard cubic meter) or less, where the particles have a diameter larger than 0.1 microns when measured at normal temperature and pressure (NTP). If a higher purity is desired, stream 38 may be passed through additional purification units to remove other contaminants, including NVR. Additional purification units can use such techniques as coalescence, adsorption, absorption/distillation, distillation, chemisorption, chemical reactions (e.g., other catalytic reactors), and/or dry scrubbing. These techniques preferably are aimed at removing those molecules that are not effectively removed within the catalytic reactor. In one embodiment, stream 38 is directed to one or more means for removing moisture formed during the oxidation reaction.

The temperature of carbon dioxide stream 38 can be manipulated by varying the size and/or flow configuration of recuperative heat exchanger 26. Alternatively, a cooler or heater may be installed downstream of recuperative heat exchanger 26. The temperature of carbon dioxide stream 38 can be adjusted to optimize the separation performance of additional purification means, if such means are employed.

In one example, stream 38 is directed to purifier bed 42, which removes contaminants such as combustion products and/or other NVRs through adsorption. Purifier bed 42 can use adsorption materials such as molecular sieves, silica gel, activated carbon, or other suitable adsorbents. The average bed has a void fraction of approximately 40%. If a contaminant particle is in the size range of about 0.1 to about 0.6 microns, it can travel through the bed without impacting adsorbent particles. Vapor phase contaminant molecules and droplets smaller than about 0.1 microns exhibit more Brownian motion and are more likely to come in contact with the adsorbent.

The carbon dioxide leaves purifier bed 42 as stream 44. Stream 44 is then directed to filter 46 to remove solid particles. A filter for this purpose removes particles larger than about 0.003 microns in diameter from vapor phase carbon dioxide and larger than about 0.1 microns in diameter from critical and supercritical carbon dioxide. Preferably, filter 46 is an all-metal, sintered metal, electronics grade filter.

The carbon dioxide leaves filter 46 as stream 48 and is directed to condenser 50. Condenser 50 condenses any carbon dioxide gas to produce a liquid by removing heat from stream 48 using cooling stream 52, which is in turn chilled by refrigerator 54. Light impurities (e.g., nitrogen, argon, hydrogen, and helium), which may be introduced with oxidant stream 16, may prevent condensation in condenser 50. These light impurities can be removed through vent stream 56, which is controlled by valve 58.

In other embodiments, a cooling stream can be provided by other means known in the art, e.g. cooling water. For example if the carbon dioxide operating pressure is about 1,000 psig (~6,895 kPa), generally cooling water is sufficiently cold since the condensation temperature of carbon dioxide will be about 81° F. (~27.2° C.). If stream 48 is in a critical or supercritical phase, it can be cooled or heated by a heater to any convenient storage temperature without condensation.

Liquid carbon dioxide exits condenser 50 as stream 60 and passes to tank 62. Tank 62 holds a supply of purified carbon dioxide that can be withdrawn as needed. Tank 62 can be of sufficient size to supply purified carbon dioxide in either a continuous or batch mode.

Condenser 50 may also be located at a position elevated with respect to tank 62. In this manner, in periods of low draw rates, liquid will build up in condenser 50 and tank 62 until the condensing surfaces are covered. This will effectively cease the condensation process. When liquid is withdrawn from tank 62, condensing area is exposed and carbon dioxide vapor will again condense, lowering the pressure in the circuit and causing pump 10 to activate drawing more carbon dioxide from tank 4, thereby controlling the delivery system. This arrangement is particularly well suited for situations where the withdrawals are made in a batchwise fashion. If stream 48 is in a critical or supercritical phase, the fluid inside the "condenser" is a dense phase fluid rather than a liquid.

Valve 64 controls the flow of the purified carbon dioxide withdrawn from tank 62 as stream 66, which is then directed to application 68. After the oxidation reaction and any other separations processes used, stream 66 preferably contains carbon dioxide with about 100,000 particles or less per standard cubic foot of carbon dioxide (~3,500,000 particles per standard cubic meter), where the particles have a diameter larger than 0.1 microns when measured at NTP. More preferably, the carbon dioxide contains about 10,000 particles or less (~350,000 particles per standard cubic meter). Most preferably, the carbon dioxide contains about 1,000 particles or less (~35,000 particles per standard cubic meter). The carbon dioxide in stream 66 can be in a condition that is needed by the application, such as a gas, a critical gas, a supercritical gas, a liquid, or a solid and vapor phase (such as used in snow cleaning applications). Optionally, the carbon dioxide can be combined with one or more components, e.g. solvents, prior to its delivery to application 68.

Application 68 prepares product 70 and can be any process that requires purified carbon dioxide. For example, application 68 can be an electronics applications, such as photoresist stripping and deposition; pharmaceutical applications, such as nanoparticle formation; the processing of MEMS, or a snow cleaning application. Application 68 can be a wafer-cleaning tool, and product 70 can be a wafer.

The purity of the carbon dioxide used in application 68 is selected to result in a product that has an acceptable quality. The acceptable quality will vary with the type and goals of a given application. For example, the acceptable quality may be a certain purity level, such as may be required in a pharmaceutical application where the final drug material must have a contaminant concentration below a certain value. If product 70 is a wafer, the acceptable quality may be the number of deposited contaminant particles being equal to or less than a maximum value.

The method for determining if product 70 has an acceptable quality will vary with a given application. The product may be monitored to determine an acceptable level of NVORs in the carbon dioxide directed to the application. For a semiconductor application, for example, the quality of the product can be determined by light scattering methods known in the art. Some light scattering methods can measuring particles having an effective diameter greater than about 0.1 micron on a solid surface. A suitable method is described in Diaz, R. E., et al., "On-Wafer Measurement of Particles in Contamination-Free Manufacturing for Semiconductors and other Precision Products," in *Contamination-Free Manufacturing for Semiconductors and other Precision Products*, edited by R. P. Donovan (Marcell Dekker), p. 79 (2001). In a pharmaceutical application, the product (e.g., powder) may be evaluated to determine if any NVOR trapped on or in the product is at or below an acceptable level. In other cases, the acceptable level of NVORs for a given application can be determined based on existing data, charts, or industry standards for a given application.

Optionally, the purity of the carbon dioxide entering or leaving application 68 can be monitored. This monitoring may be useful for determining if the carbon dioxide to be used (or used) in application 68 will result in a workpiece or product with an acceptable quality. For example in FIG. 1, the purity of the delivered carbon dioxide is measured in analyzer 80. In this configuration, at least a portion of the purified carbon dioxide is withdrawn and passed through particle filter 82, warmed in heater 84 and then dropped in pressure across pressure reduction device 86 to yield a lower pressure gas stream that is above the sublimation temperature of carbon dioxide at that pressure and more preferably close to ambient temperature. Based on the readings of analyzer 80, the flow rate of oxidant stream 16 and/or the operating temperature of catalytic reactor 32 may be modified to ensure that the purity specifications are met. Preferably, the specification will be about 100,000 particles or less per cubic foot (~3,500,000 particles per cubic meter) at normal temperature and pressure, where the particles are greater than 0.1 microns in diameter. More preferably, the specification will be about 10,000 particles or less (~350,000 particles per cubic meter). Most preferably, the specification will be about 1,000 particles or less (~35,000 particles per cubic meter).

Analyzer 80 can be various types of analyzers. Preferably, analyzer 80 is a particle analyzer based on light scattering techniques or a single-particle counter, such as those described in U.S. patent application Ser. No. 10/350,307, filed on Jan. 22, 2003 and entitled "Method for Analyzing Impurities in Carbon Dioxide." The teachings of that application are incorporated herein by reference in their entirety. To determine if carbon dioxide will produce acceptable results, the conditions of the carbon dioxide are modified so that at least a portion of the contaminants are in a precipitated form. Then the contaminants are passed through a particle detector, such as a light-scattering particle counter or a single-particle counter. Generally, light-scattering particle counters detect particles through the particles' interactions with a light beam. Single-particle counters are sensitive enough to detect the interactions of a single particle.

Once a stream purity has been determined to produce a product with acceptable quality, the temperatures of catalytic reactor 32 can be controlled to ensure that the purified carbon dioxide stream has an acceptable level of NVOR for application 68.

When product 70 has been processed sufficiently, the carbon dioxide and any entrained and/or dissolved contaminant leaves application 68 through exhaust stream 72. If desired, exhaust stream 72 can be sent to phase separator 74 to separate any vapor, liquids, and solids contained in stream 72. The liquids and/or solids exit phase separator 74 as stream 76, which can be collected for disposal or reclamation. The vapor leaves separator 74 as stream 78, and can be vented or recycled for further use.

Preferably, the materials used in constructing system 2 are chosen to minimize exposure of the carbon dioxide to elastomeric materials that may leach contaminants into the carbon dioxide. UHP construction techniques (e.g., use of electropolished surfaces, orbital welding) are also preferable, particularly downstream of catalytic reactor 32.

Figure 2:
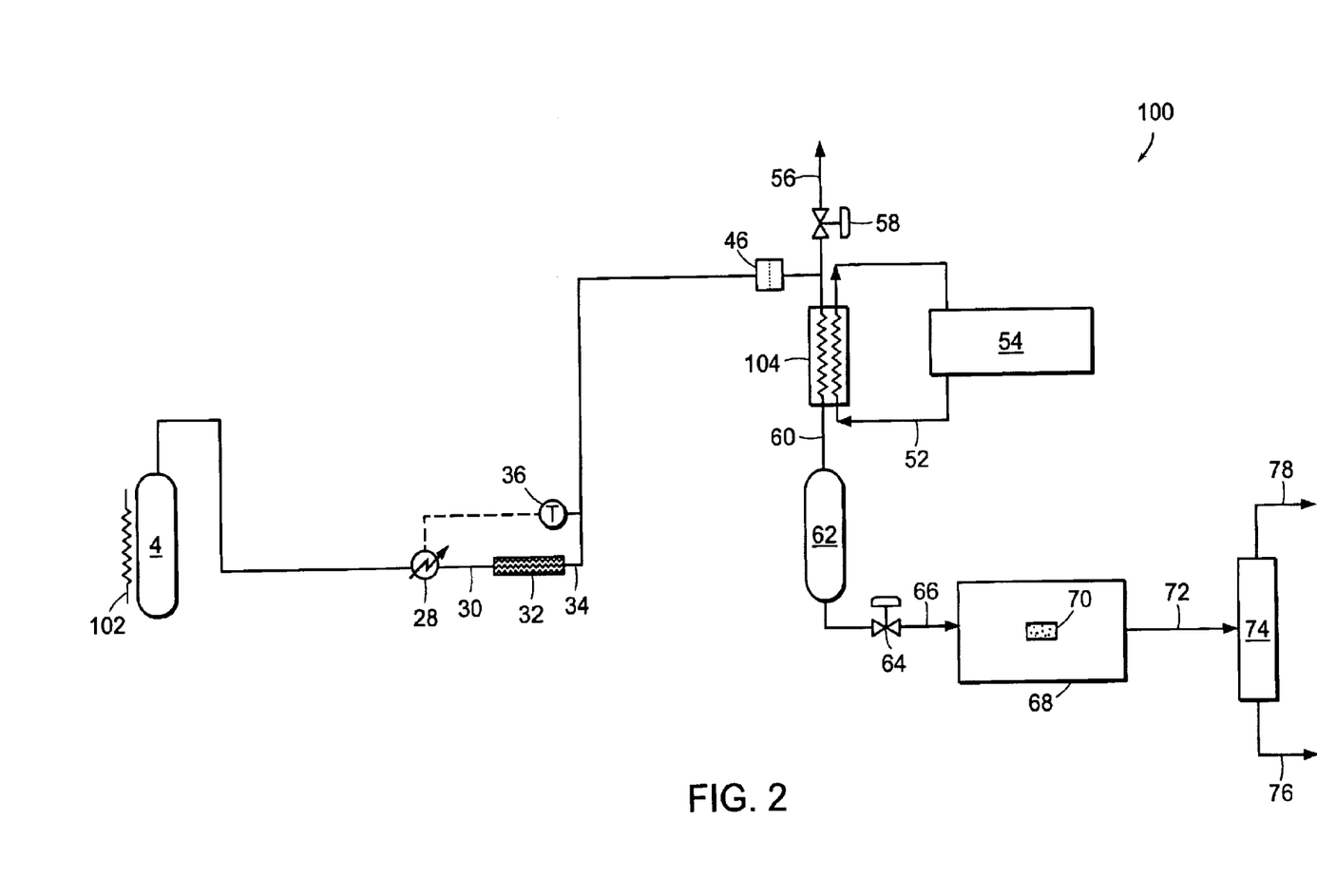
FIG. 2 illustrates a schematic diagram of a system that is particularly suited for applications requiring small flow rates of purified carbon dioxide or those that use carbon dioxide delivered from a series of cylinders.

FIG. 2 shows system 100. No pumps are used within system 100. The pressure of the carbon dioxide in system 100 is substantially the same as the pressure in tank 4. The carbon dioxide liquid or vapor in tank 4 is withdrawn at about the vapor pressure of carbon dioxide. For example, if tank 4 is at room temperature (~21.1° C.), the carbon dioxide vapor will be at about saturation pressure (~5,861 kPa). To maintain the necessary pressure inside of tank 4, heat source 102 may add a small amount of heat to the carbon dioxide in tank 4.

Single cylinders or a manifolded bank of cylinders may be used, depending on use rate. In system 100, coalescer 22 and recuperative heat exchanger 26 shown in system 2 (FIG. 1) are omitted. Heater 28 raises the temperature of the carbon dioxide leaving tank 4 to the temperature needed inside of catalytic reactor 32. In addition, purifying bed 42 (FIG. 1) has been omitted and condenser 50 (FIG. 1) has been replaced by heat exchanger 104. By opening valve 58, line 56 can vent light impurities from heat exchanger 104.

System 100 is particularly suitable for applications requiring small flow rates of purified carbon dioxide or those that use carbon dioxide delivered from a series of cylinders.

Figure 3:
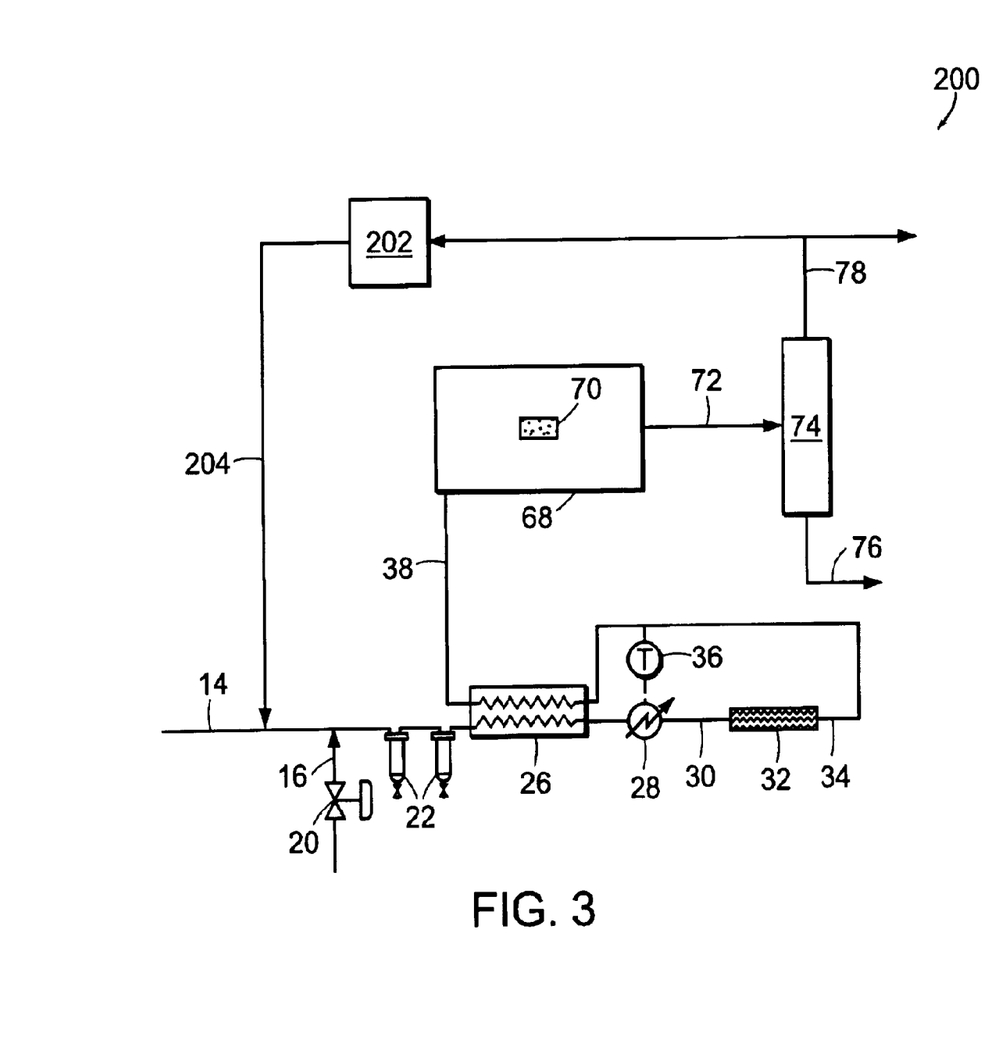
FIG. 3 illustrates a system for conducting one embodiment of the method of the invention in which at least a portion of the carbon dioxide is recycled after use in an application.

FIG. 3 illustrates system 200 in which at least a portion of the carbon dioxide is recycled after use in application 68. At least a portion of the carbon dioxide in stream 78 is recycled. If desired, the recycled portion can be directed through optional purification means 202, which can remove contaminants that may poison the catalyst in catalytic reactor 32, such as halogenated compounds. Optional purification means 202 can include adsorption, chemisorption, chemical reactions, phase separation, absorption, distillation, filtration, as well as other separations techniques known in the art. The recycled carbon dioxide in stream 204 is then mixed with stream 14 and oxidant stream 16 and then directed to catalytic reactor 32, essentially as described above.

Figure 4:
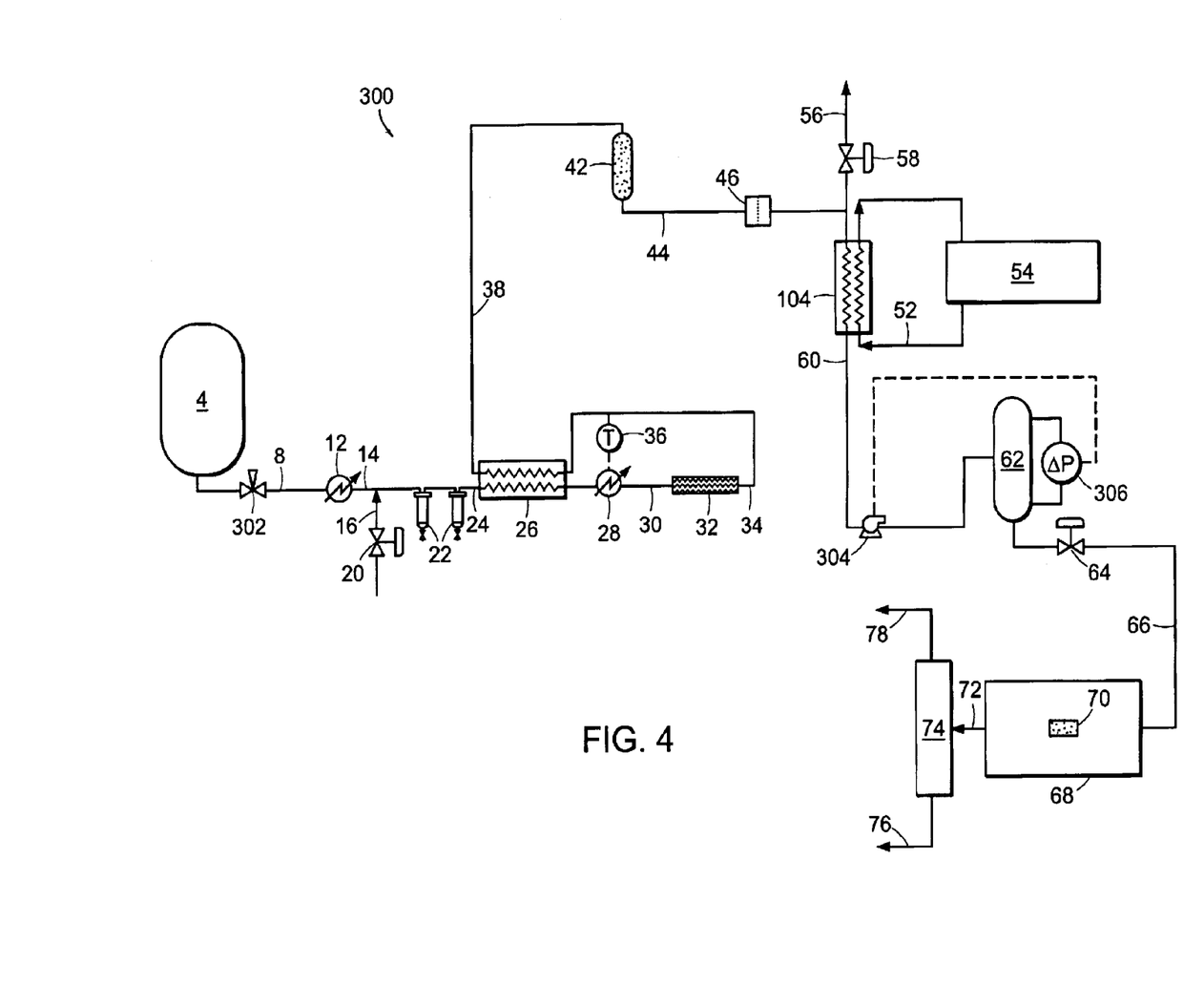
FIG. 4 illustrates a system for conducting one embodiment of the method of the invention where a catalytic reactor is operated at a pressure equal to or less than the supply pressure of the carbon dioxide.

FIG. 4 illustrates system 300, where catalytic reactor 32 is operated at a pressure equal to or less than the supply pressure of tank 4. Flow control device 302 controls the flow rate of carbon dioxide from tank 4. Flow control device 302 can be a flow orifice or a flow control valve, for example. The subcooled liquid carbon dioxide in stream 60 is pumped to tank 62 by pump 304. Differential pressure analyzer 306 can activate pump 304 based on the hydrostatic head in tank 62. Alternatively, pump 304 could be activated based on the weight of tank 62.

EXAMPLE 1

Figure 5:
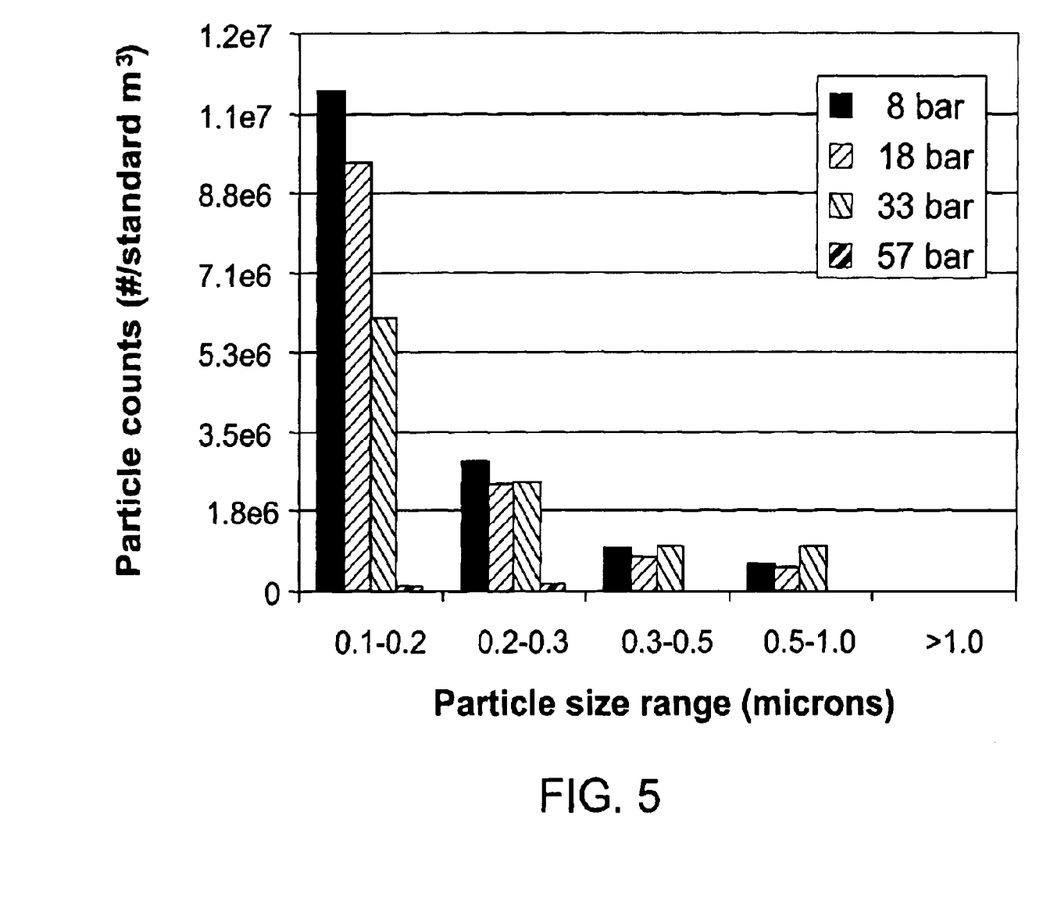
FIG. 5 illustrates a size distribution of particles that precipitate when the pressure of carbon dioxide is reduced by varying amounts.

Carbon dioxide was purified in a system similar to system 2 illustrated in FIG. 1. Carbon dioxide was drawn from the vapor space of a carbon dioxide cylinder containing SFE grade carbon dioxide. The cylinder contained saturated liquid at ambient temperature, and a pressure of approximately 820 psia (~5654 kPa). The vapor was then passed through coalescing filters operating at cylinder pressure. This stream was reduced in pressure and passed through a 0.003-micron electronics grade particle filter for removal of solid particles. Heat was applied upstream of the pressure reduction device to ensure that the carbon dioxide entering a downstream particle analyzer was approximately ambient temperature. FIG. 5 shows the particle counts as a function of the pressure to which the stream was reduced. At the highest pressure, the reduction in pressure is minor and so is the number of particles. This is consistent with the use of high efficiency coalescers. However, as the pressure is reduced further, a large number of submicron droplets are formed. This indicates that the solubility of heavy contaminants in the carbon dioxide is actually decreasing as the pressure is reduced. Solid particles shedding from the pressure reduction means were shown to be negligible compared to the levels that were measured, supporting the fact that the vast majority of the particles arose due to a loss of solubility of contaminant in the carbon dioxide.

EXAMPLE 2

EIG carbon dioxide liquid at 300 psig (~2068 kPa) was drawn from a bulk tank, vaporized, and passed through a thermal catalytic reactor. The catalyst reactor included three PRO*VOC 10 catalysts from Süd-Chemie Prototech, Inc. (Needham, Mass.). PRO*VOC 10 catalyst is a platinum-based metal on ceramic foam. The reactor was operated at various temperatures, from ambient (~21.1° C.) to 315.6° C. The space velocity in all tests was 44,000 scfh/ft³ (44,000 standard cubic meters per hour per cubic meter of catalyst volume). Oxygen was added to the carbon dioxide upstream of the reactor to yield 600 ppm by volume oxygen in the mixture.

Figure 6:
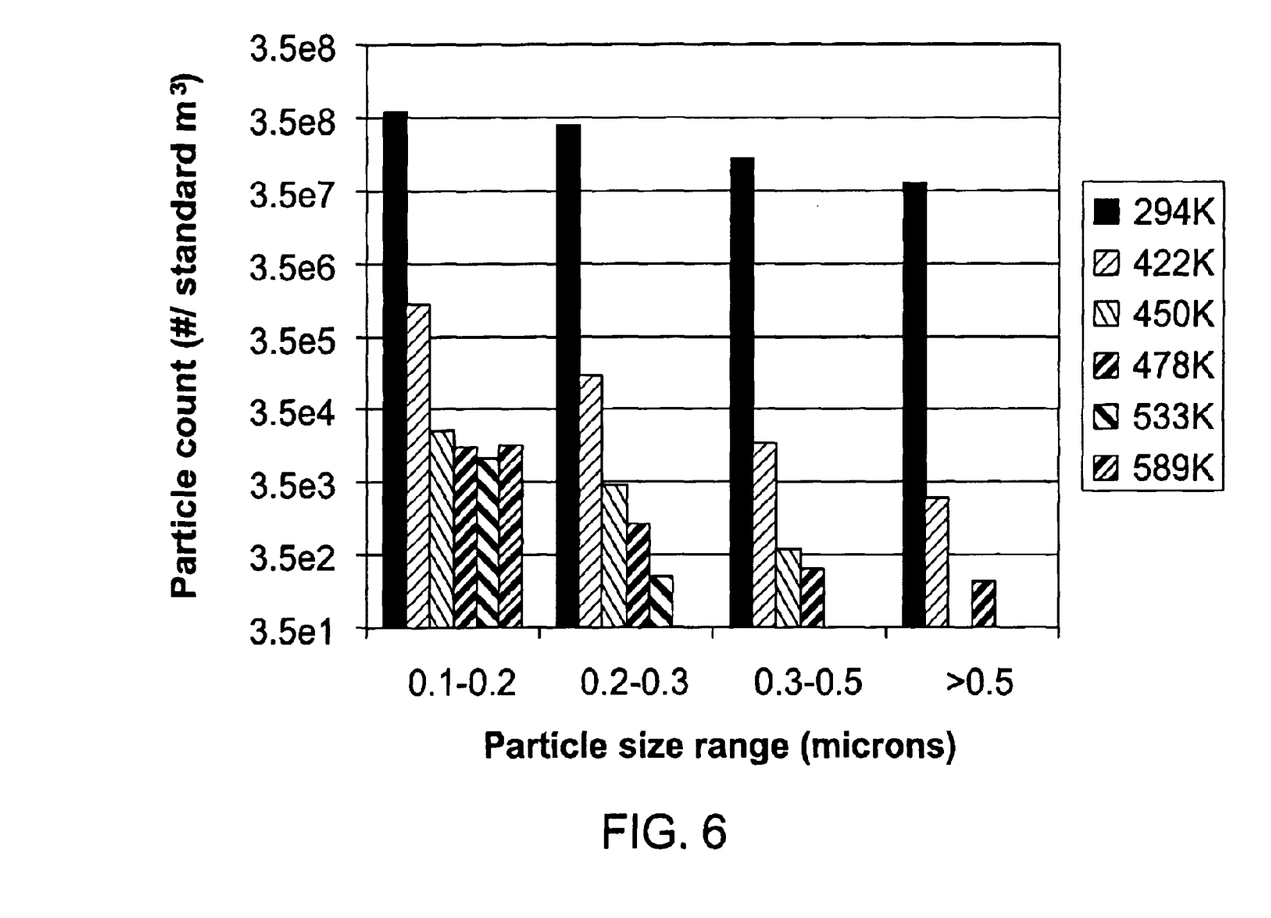
FIG. 6 illustrates a size distribution of particles that precipitate from carbon dioxide that has been directed through a catalytic reactor at various temperatures.

FIG. 6 shows the particle size distribution as a function of reactor temperature, where the particles were measured downstream of the reactor at ambient temperature and approximately the same pressure as the reactor. The number of particles measured when the reactor was at essentially room temperature is very high. However, the number of particles measured was dramatically reduced when the catalyst was operated at a temperature of 300° F. (~148.9° C.) or more. Operation at temperatures greater than 350° F. (~176.6° C.) produced NVOR levels that are very small.

Note that a solid particle filter was not used downstream of the reactor. Therefore, the measured particle levels include solid particles, such as those that may be shed by the catalyst.

Figure 7:
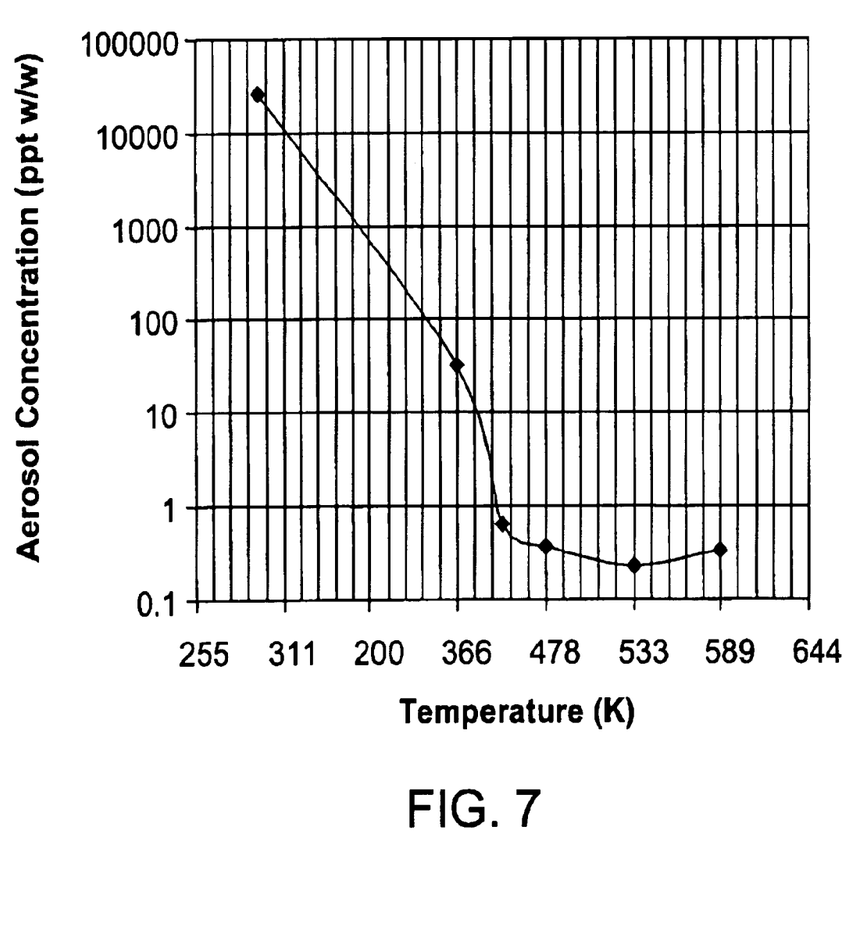
FIG. 7 illustrates the impact of temperature on purification efficiency.

The same data is shown in FIG. 7 as total aerosol concentration as function of reactor temperature. To calculate the aerosol concentration, some assumptions were made. First, the typical particle is assumed to be the smallest in each given range. For example, in the 0.2–0.3 micron size range the particle size is assumed to be 0.2 microns. Second, the specific gravity of the contaminant particles was assumed to be 0.8.

FIG. 7 demostrates that there is a strong correlation between reaction temperature and NVOR removal and that there is a dramatic reduction in the aerosol concentration with temperature. This data may mask the impact of temperature on the removal of NVOR when the measured aerosol concentration is low due to the contribution of solid particles generated from the catalyst and/or distribution piping.

EXAMPLE 3

EIG carbon dioxide was passed through a catalytic reactor, containing three PRO*VOC 10 catalysts (Pt-based metal on ceramic foam) as described in Example 2, again without coalescence prior to the reactor. The temperature of the reactor was 600° F. (315.5° C.), and excess oxygen (~600 ppm by volume) was added to the stream. Under these conditions, particle counting at reactor pressure and ambient temperature showed essentially complete extinction of particles.

Figure 8:
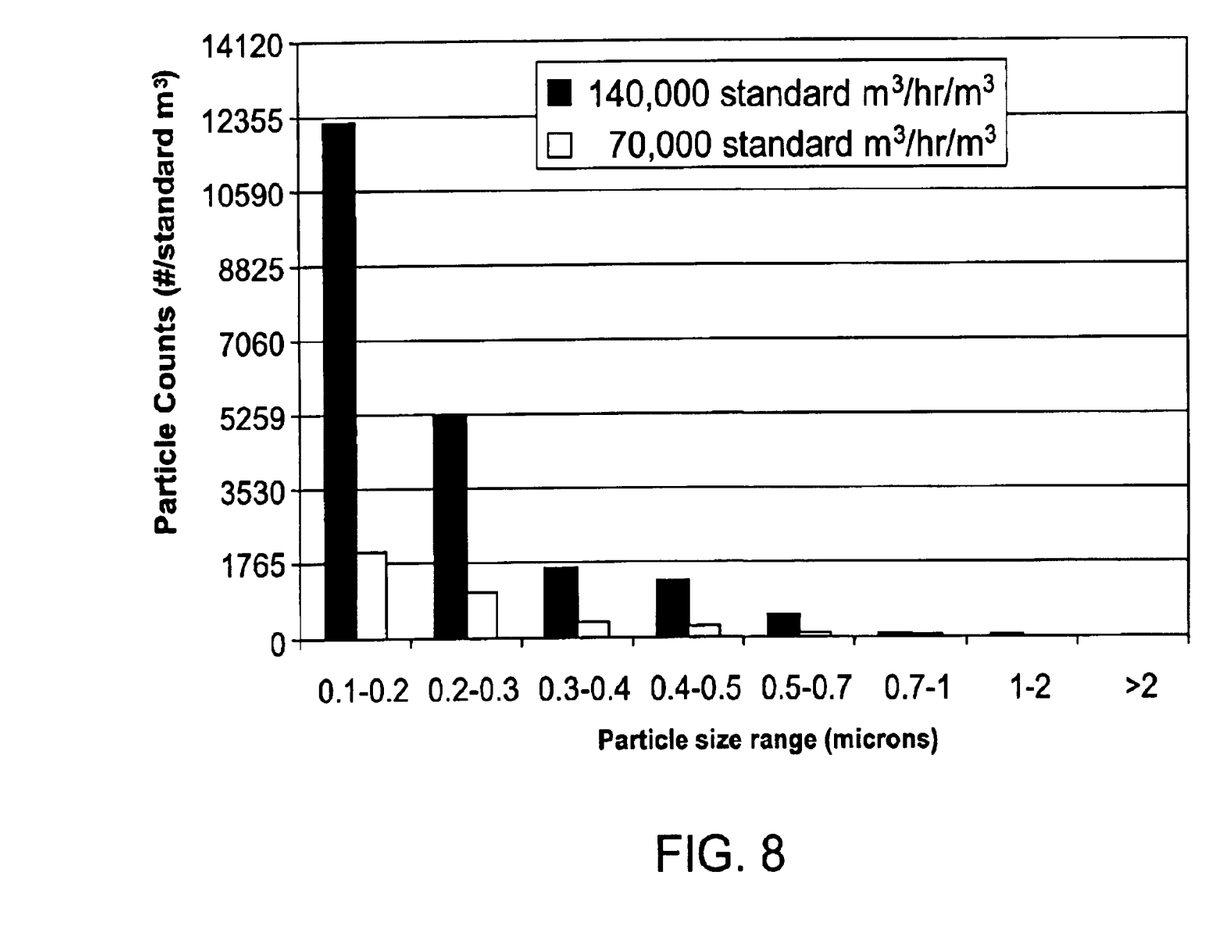
FIG. 8 illustrates the impact of space velocity on purification efficiency.

FIG. 8 shows a concurrent analysis of the stream in a low pressure particle analyzer operating at near ambient temperature and pressure, at two space velocities. The particle count in the vapor fed to the catalytic system is in excess of $10^7$ per cubic foot (about 353 million particles per cubic meter) when measured at normal temperature and pressure. Downstream of the reactor it is reduced to about 600 and 100 particles per cubic foot (about 21,000 and 3,500 particles per cubic meter, respectively) when measured at NTP at a space velocity of 140,000 and 70,000 scfh/ft³ (respectively, 140,000 and 70,000 standard cubic meters per hour per cubic meter of catalyst volume) respectively.

EXAMPLE 4

EIG carbon dioxide was passed through a catalytic reactor containing three PRO*VOC 10 catalysts (Pt-based metal on ceramic foam) as described in Example 2. No additional oxygen was added to the carbon dioxide being fed from the bulk tank source. The reactor was operated at about 700° F. (~371° C.) and at a space velocity of about 140,000 scfh/ft³ (~140,000 standard cubic meters per hour per cubic meter of catalyst). A metal monolith with a palladium catalyst coating was used in the reactor. Particle analysis was done at ambient temperature and pressure. Again, the carbon dioxide feed to the system is known to have in excess of $10^7$ particles per cubic foot at NTP (about 353 million particles per cubic meter).

Figure 9:
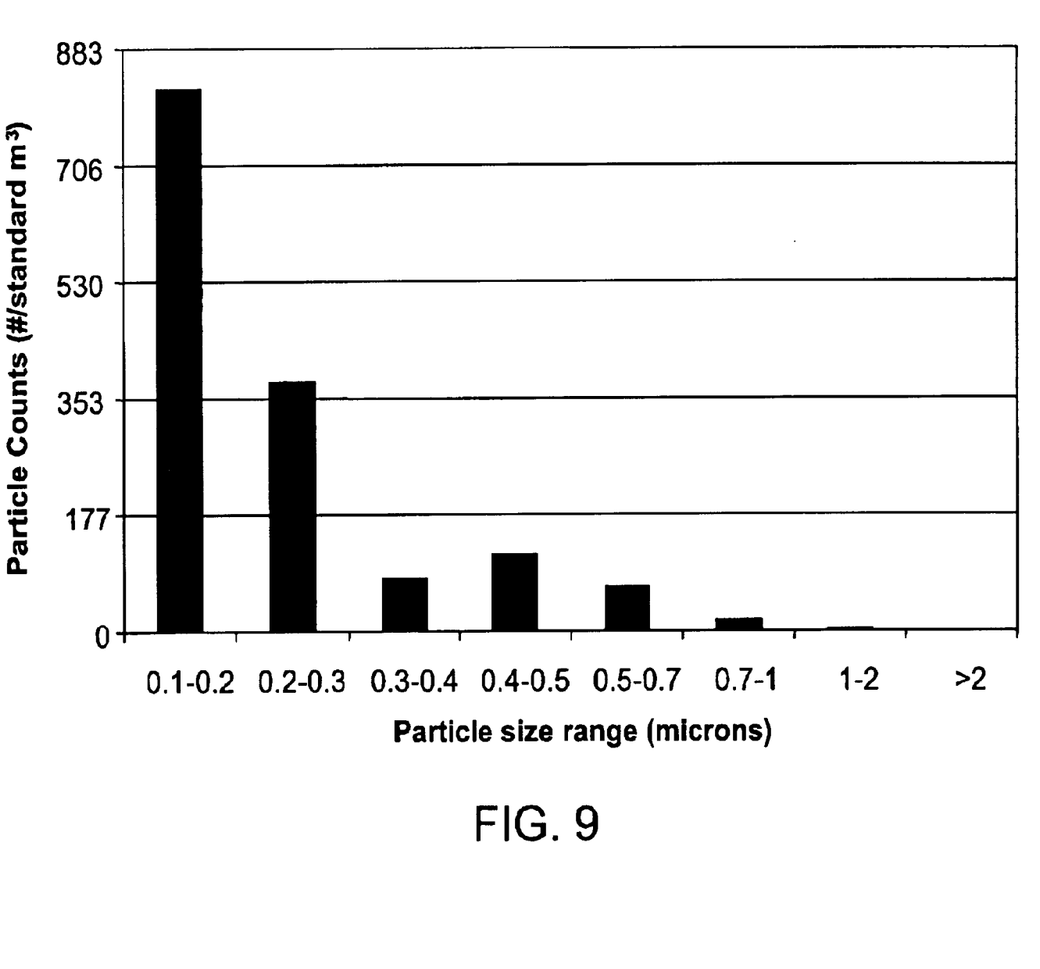
FIG. 9 illustrates a size distribution of particles leaving a reactor.

FIG. 9 shows the particle size distribution leaving the reactor, measured at NTP. The carbon dioxide leaving the reactor has less than 50 particles per cubic foot (about 1,765 particles per cubic meter). The reduction in the particle count (the ratio of particles into the system to particles leaving the system, measured at about NTP) is approximately six orders of magnitude. The relative reduction in contaminant with respect to weight is even higher since the size distribution of particles in the less contaminated stream is shifted towards particles of a smaller size. In this case, excellent performance was obtained without the need to mix additional reactants with the carbon dioxide or coalescence upstream of the reactor. This showed that it may not be necessary to mix reactants with the carbon dioxide to achieve excellent purification. The need for additional reactants depends on the level of heavy contamination and the amount of oxygen and moisture present in the incoming carbon dioxide.

Equivalents

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for delivering purified carbon dioxide to an application, comprising the steps of:
    a) determining an acceptable level of nonvolatile organic residues in purified carbon dioxide,
    b) exposing carbon dioxide which is in a condition selected from the group of near-critical, critical and supercritical, to at least one catalyst at a temperature controlled to produce the purified carbon dioxide, wherein said purified carbon dioxide has a concentration of less than 10 ppb of nonvolatile organic residues; and
    c) directing the purified carbon dioxide an application.

2. The method of claim 1, further including the step of mixing an oxidant with the carbon dioxide before exposing the carbon dioxide to the catalyst, wherein the oxidant is at least one of the group selected from oxygen, air, and oxygen enriched air.

3. The method of claim 1, wherein the application is a semiconductor process.

4. The method of claim 1, further including the step of heating the carbon dioxide before it is exposed to the catalyst.

5. The method of claim 1, further including the step of cooling the purified carbon dioxide before it is directed to the application.

6. The method of claim 5, wherein the purified carbon dioxide is in a liquid state when it is directed to the application.

7. The method of claim 1, further including the step of pressurizing the purified carbon dioxide before it is directed to the application.

8. The method of claim 1, further including the step of pressurizing the carbon dioxide before it is exposed to the catalyst.

9. The method of claim 1, further including the step of directing the purified carbon dioxide to at least one purification unit before it is directed to the application, where said purification unit is selected from die group consisting of a filter, a coalescing filter, an adsorption bed, an absorption bed, a reactor, and a scrubbing unit.

10. The method of claim 9, wherein the temperature of the purified carbon dioxide is selected to optimize the separation capability of the purification unit.

11. The method of claim 1, further including the step of directing the carbon dioxide to at least one coalescing filter before it is exposed to at least one catalyst.

12. The method of claim 1, further including the step of directing at least a portion of the purified carbon dioxide to at least one analyzer unit selected from the group consisting of a light-scattering analyzer and a single-particle counter.

13. The method of claim 1, wherein the purified carbon dioxide contains less than 100,000 particles of nonvolatile organic residues, each with a diameter greater than 0.1 micron, per cubic foot when measured at normal temperature and pressure.

14. The method of claim 1, wherein water is added to the carbon dioxide before it is exposed to the catalyst.

15. The method of claim 1, further including the step of recycling at least a portion of the purified carbon dioxide used in the application and exposing the recycled portion to the catalyst.

16. A method for purifying carbon dioxide, comprising the steps of:
   a) exposing carbon dioxide to at least one catalyst, wherein the carbon dioxide is in a condition selected from the group consisting of near-critical, critical, and supercritical; and
   b) oxidizing at least a portion of the contaminants, thereby forming purified carbon dioxide.

17. A The method of claim 16, further including the step of directing the purified carbon dioxide to an application.

18. The method of claim 17, wherein the application is a semiconductor process.

19. The method of claim 17, further including the step of mixing an oxidant with the carbon dioxide before exposing the carbon dioxide to the catalyst, wherein the oxidant is at least one of the group selected from oxygen, air, and oxygen enriched air.

20. The method of claim 16, wherein the conditions of the carbon dioxide are modified to produce supercritical carbon dioxide before the carbon dioxide is exposed to the catalyst.

21. The method of claim 16, further including the step of cooling the purified carbon dioxide after it is exposed to the catalyst.

22. The method of claim 16, further including the step of directing the purified carbon dioxide to at least one purification unit selected from the group consisting of a filter, a coalescing filter, an adsorption bed, a distillation tower, an absorption/distillation unit, a reactor, a scrubbing unit, and an absorption bed.

23. The method of claim 22, wherein the temperature of the purified carbon dioxide is selected to optimize the separation capability of the purification unit.

24. The method of claim 16, further including the step of directing at least a portion of the purified carbon dioxide to at least one analyzer unit selected from the group consisting of a light-scattering analyzer and a single-particle particle counter.

25. The method of claim 16, wherein the purified carbon dioxide contains less than 100,000 particles of nonvolatile organic residues, each with a diameter greater than 0.1 micron, per square foot when measured at normal temperature and pressure.

26. The method of claim 16, further including the step of recycling at least a portion of the purified carbon dioxide and exposing it to the catalyst.

27. A method for delivering purified carbon dioxide to an application, comprising the steps of:
   a) determining a minimum oxidation temperature, wherein exposing carbon dioxide which is in a condition selected from the group of near-critical, critical and supercritical, to a catalyst at that minimum oxidation temperature will result in a purified carbon dioxide having a concentration of less than 10 ppb nonvolatile organic residues
   b) exposing carbon dioxide in one of the said condition to the catalyst at the said temperature thereby producing purified carbon dioxide; and
   c) directing at least a portion of the purified carbon dioxide to an application.

* * * * *